Aug. 11, 1959
H. V. CARTER
2,899,013
APPARATUS FOR RECOVERY OF PETROLEUM
VAPORS FROM RUN TANKS
Filed April 9, 1956
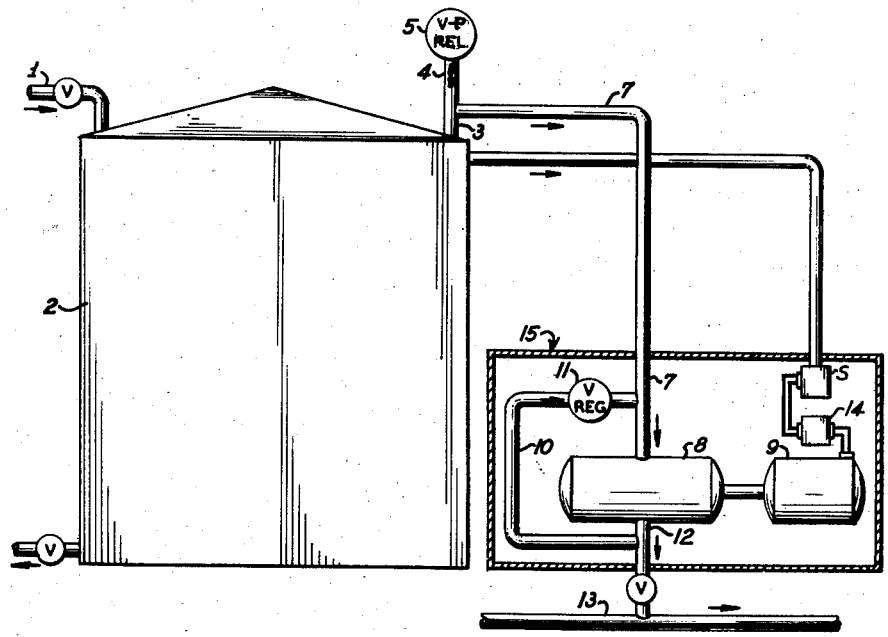
INVENTOR
HARRY V. CARTER
BY
ATTORNEY

United States Patent Office 2,899,013
Patented Aug. 11, 1959

2,899,013

APPARATUS FOR RECOVERY OF PETROLEUM VAPORS FROM RUN TANKS

Harry V. Carter, Tulsa, Okla., assignor, by mesne assignments, to National Tank Company, Tulsa, Okla., a corporation of Nevada Application April 9, 1956, Serial No. 576,899

2 Claims. (Cl. 183—2.7)

This invention relates to apparatus for the recovery of gas and vapors from crude petroleum run tanks on oil producing properties, but which are also applicable to the recovery of vapors from petroleum products storage tanks in refineries, gasoline plants, chemical plants, and pipeline terminals.

In most oil producing formations all or a large fraction of the gas present is in solution in the oil. When this fluid is brought to the surface it is delivered to oil and gas separator units where, under the reduced pressure, most of the gas evaporates or boils off and is recovered and piped to some central plant where the gasoline, butanes and propanes are completely or partially recovered, the remaining gas being available for fuel or for sale to gas distributors.

The evaporation taking place in the oil and gas separator units is accompanied by a large drop in the temperature of the remaining liquid, and this in turn gradually reduces the boiling of the oil and leaves light hydrocarbons in the crude oil. Usually, the oil and gas separator units are operated at a pressure ranging from a few pounds to hundreds of pounds above atmospheric pressure. When wells have very high bottom hole pressures and high ratios of gas to oil, the oil and gas is frequently separated in two or three pressure stages so as to obtain the larger proportion of it under high pressure, thus avoiding expensive compressing operations which otherwise would be necessary in discharging the gas into gathering and/or storage facilities, and also avoiding losses of valuable oil components into the less valuable gases usually present in fuel gas recovery and gathering systems.

Nearly all known oil lease production practices result in the crude oil passing from the oil and gas separator units into a run tank operating at or near atmospheric pressure by means of the difference in pressure which exists between the separators and tank. The oil in the oil and gas separators as stated, is chilled by evaporation of the gas, but the oil in the flow lines to the run tank and in the run tank boils to some extent because of reduction in pressure and the increase in temperature, particularly in warm weather. Under known practice, no practical method has been devised to recover these tank vapors which for the most part are composed of gasoline, butane and propane and therefore quite valuable. Usually, the gasoline plant pipeline gathering system taking the gas from the oil and gas separator units is operated above atmospheric pressure so that any gas or vapor from the run tanks will not enter these pressurized pipelines. In some cases where the gas volume of the run tanks is large and the tanks close together or where atmospheric pollution prevention is important, separate pipeline gathering systems operating at pressures slightly below atmospheric have been used. However, such systems are not usually economically justifiable.

The principal object of my invention is to provide an apparatus for recovering crude oil vapors from crude oil run tanks which are operating at pressures not exceeding one pound per square inch and usually at about four inches of water pressure or less and delivering such vapors under a higher pressure into a conventional pressurized gas gathering pipeline system.

Another object of my invention is to provide an apparatus as above described by which run tank vapors may be continuously withdrawn therefrom while maintaining tank pressure within the pressure range required, which pressure may be as low as one inch of water pressure above or below atmospheric pressure.

Another object of my invention is to provide an apparatus as above described, including a compressor driven by an electric motor with means to automatically start the motor when the run tank pressure reaches a desired value and to stop the motor when the pressure on the tank is reduced to a desired value.

These and other objects and advantages of my invention will become apparent upon reading the following description in connection with the attached drawing, wherein is illustrated diagrammatically a preferred form of the invention.

Referring more particularly to the drawing, oil and some flashed gas from one or more oil and gas separator units (not shown) passes through pipe 1 into the usual closed run tank 2 which is operated at or near atmospheric pressure. The vapors resulting from evaporation in the pipeline 1 and in the tank 2 accumulate in the upper part of tank 2 and pass out or are drawn therefrom through pipes 3 and 7 to the inlet of a gas compressor 8, driven by an electric motor 9. The compressor 8 may be of any desired form but some type of rotary compressor is preferred. A gas bypass line 10 is provided for the compressor 8, said bypass line connecting the discharge side of the compressor with the inlet side thereof. The bypass line 10 includes a normally closed but adjustable pressure-reducing valve and regulator unit 11, said unit operating to open the valve when pressure at the inlet side of the compressor falls below the minimum value for which the regulator 11 is set, to permit compressed gas from the discharge side of the compressor to return to the compressor inlet, thus preventing further decrease in the pressure within the tank while the compressor continues in operation. The compressor 8 discharges through pipeline 12 into a pressurized gas-gathering pipeline 13. Where the flow of gas and vapor from the run tank is fairly steady and continuous, the compressor runs continuously, the pressure within the tank 2 being controlled by recirculation of the gas through the bypass 10 under the control of the regulator 11. When, however, the system is operated under conditions where the flow of gas and oil into the run tank is irregular because of the supplying wells being shut down a considerable part of the time, or for other reasons, a sensitive vacuum-pressure switch unit S of conventional design may be used to stop and start the motor 9 through control of a motor starter unit 14 of conventional design. Switch contacts operatively associated with the pressure and vacuum sides of the switch unit S may energize and de-energize the starter unit 14 through low voltage control circuits and an appropriate relay system (not shown).

For additional protection against undesired values of vacuum and pressure within the tank 2, a conventional vacuum-pressure relief valve 5 may be employed and connected to the top of the tank 2 by pipeline 4.

The motor-compressor unit and controls, including the motor 9, compressor 8, the motor starter 14, the bypass 10 with its regulator 11 and the switch unit S may be conveniently mounted upon a portable base or frame and appropriately protected from adverse weather conditions by suitable housing. The unit as thus arranged may be readily connected to run tanks now in use.

Having thus described my invention, it is apparent that I provide an apparatus for recovering gas and vapors from conventional run tanks operated at low pressure and delivering said gas and vapors to pressurized gathering pipelines under pressure. The apparatus provides for substantially continuous operation of a motor driven compressor by the provision of a normally closed bypass connection between the discharge and inlet sides of the compressor, which bypass is automatically opened whenever pressure at the inlet side of the compressor falls below a predetermined value and closes when pressure at the inlet side of the compressor is normal. By mounting the compressor unit and controls on a portable base or frame, the entire apparatus may be moved or shipped as a unit and readily connected to run tanks now in operation with a minimum of effort. It will be understood that the vacuum pressure release unit 5, the pressure reducing valve and regulator unit 11, the vacuum pressure switch unit S and the motor starter unit 14 are all regular articles of commerce and the constructions thereof per se form no part of the present invention.

It is to be understood that the form of the invention as described and illustrated in the accompanying drawings is but for the purpose of example only and those persons skilled in the art will readily recognize that various changes may be made in the size and arrangement of the apparatus without departing from the spirit of the invention, the limits of which are set forth more fully in the appended claims.

I claim:

1. In combination with a crude petroleum oil run tank; a gas motor-compressor drawing vapors from the run tank and discharging the vapors into a receiver; and a control system for the motor-compressor with which the pressure of the run tank is maintained within desired limits and the motor-compressor is operated only during the times required to maintain the run tank pressure within the predetermined limits including; a by-pass connection between the discharge side of the motor-compressor and the intake side connected to the vapor space of the run tank, an adjustable pressure-reducing regulator valve in the by-pass connection which opens the by-pass connection when pressure at the inlet side of the motor-compressor connected to the vapor space of the run tank falls below a minimum value to prevent further decrease in the pressure within the tank while the motor-compressor continues to operate when the flow of gas and oil into the run tank is regular, and a vacuum-pressure switch responsive to the vapor pressure of the run tank to stop and start the motor-compressor when the flow of gas and oil into the run tank is irregular.

2. The combination of claim 1 in which motor-compressor is electric driven and the vacuum-pressure switch controls the circuit of the electric-driven motor-compressor to stop and start the motor-compressor through a starter means.

References Cited in the file of this patent
UNITED STATES PATENTS

| | | |
|---|---|---|
| 1,858,517 | Marshall | May 17, 1932 |
| 1,918,100 | Harnsberger | July 11, 1933 |
| 2,013,167 | Musto | Sept. 3, 1935 |
| 2,059,942 | Gibson | Nov. 3, 1936 |
| 2,664,170 | Walker et al. | Dec. 29, 1953 |